April 20, 1926.
C. N. TEETOR
PISTON RING
Filed Jan. 11, 1926
1,581,246
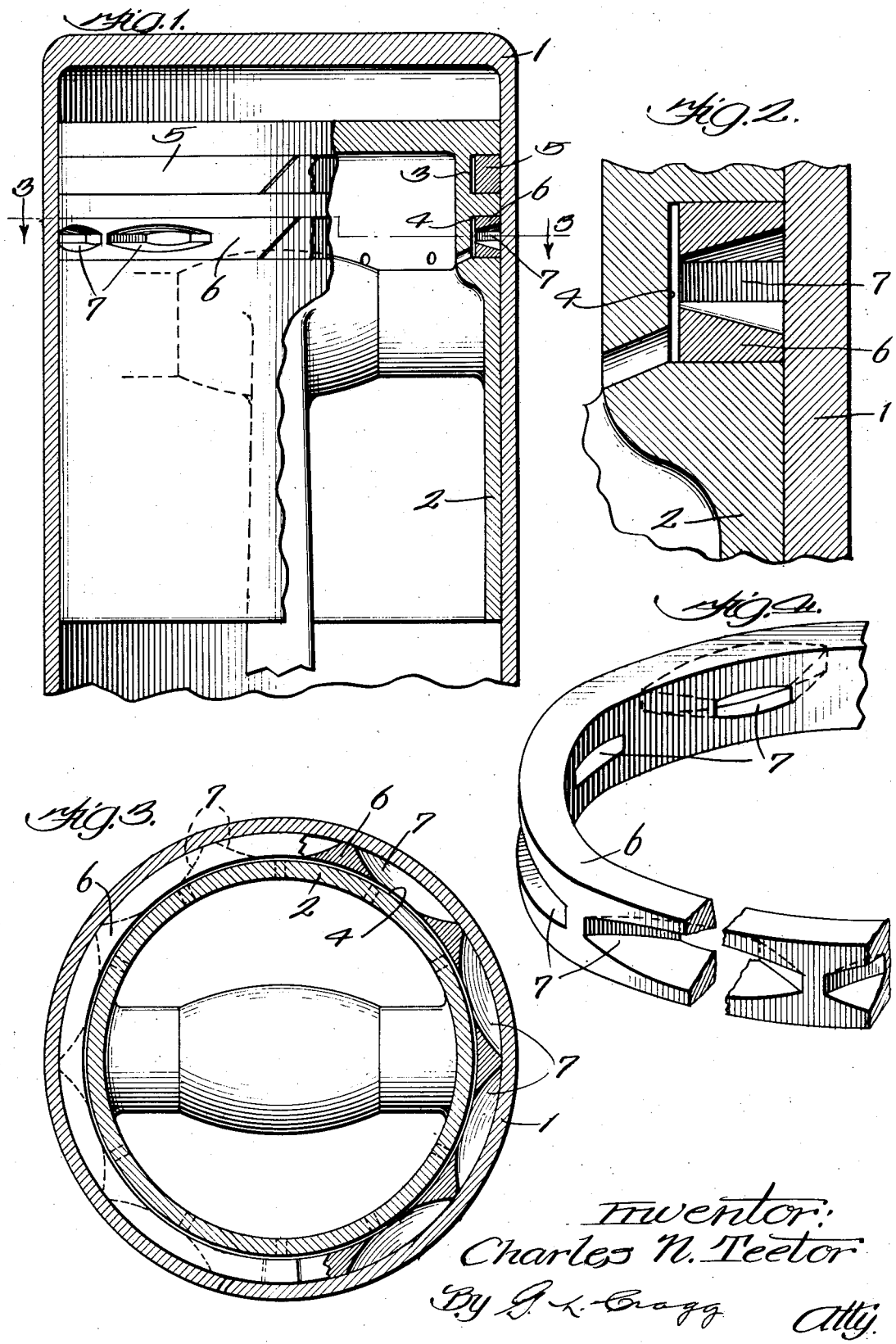
Inventor:
Charles N. Teetor
By G. L. Cragg
Atty.

Patented Apr. 20, 1926.

1,581,246

UNITED STATES PATENT OFFICE.

CHARLES N. TEETOR, OF HAGERSTOWN, INDIANA.

PISTON RING.

Application filed January 11, 1926. Serial No. 80,552.

*To all whom it may concern:*

Be it known that I, CHARLES N. TEETOR, a citizen of the United States, residing at Hagerstown, in the county of Wayne and the State of Indiana, have invented a certain new and useful Improvement in Piston Rings, of which the following is a full, clear, concise, and exact description.

My invention relates to piston rings, the invention being of particular service in connection with those rings that employ channels extending therethrough to establish communication between the interiors and exteriors of the rings for the passage of lubricant to the ring containing grooves in the pistons from whence the lubricant is returned to the interiors of the pistons and the crank cases in communication with the piston interiors.

My invention, in its preferred embodiment resides in a new formation of these ring penetrating channels whereby they not only serve as lubricant conveying passages but also serve to throttle or retard the flow of lubricant therethrough to retain the lubricant in sufficient quantity to afford the desired sealing between the ring and the enclosing cylinder whose interior surface is engaged by the outer cylindrical surface of the ring. I desirably distribute these channels throughout the circle of the ring so that the ring need be provided with no additional channel formation to establish communication between the channels directly at the exterior cylindrical surface of the ring. The channels themselves taper or converge inwardly transversely of the ring and desirably, also, longitudinally of the ring, the tapering formations at the ends of the channels aiding in the transfer of lubricant between the channels at the exterior of the ring whereby the exterior cylindrical ring surface portions between adjacent channels are effectively lubricated. The converging or tapering formations of the channels define inwardly converging or tapering formations for the lubricant while contained therein, the egress of the lubricant at the inner side of the ring being sufficiently retarded to enable the inwardly tapering or converging bodies of lubricant properly to perform their sealing function. The tapering of the channels is desirably afforded by providing smooth sloping surfaces for each side and each end of each channel, though the invention is not to be limited to unbroken surfaces for the ends and sides of the channels.

The invention will be more fully explained in connection with the accompanying drawing in which Fig. 1 is a view partially in section and partially in elevation illustrating a ring of my invention, a piston furnished with the ring and a cylinder in which the piston reciprocates; Fig. 2 is an enlargement of a portion of Fig. 1; Fig. 3 is a sectional view on line 3—3 of Fig. 1; and Fig. 4 is a perspective view of a portion of the ring.

My invention is of particular service in connection with internal combustion hydro-carbon engines, though the invention is not to be thus restricted.

The engine cylinder 1 may be of any suitable type, the engine cylinder usually communicating at its inner end with a crank case containing a bath of lubricating oil from which working parts of the engine are supplied. The piston 2 is of any suitable or usual form, having one or more annular piston ring grooves 3, 4 that receive piston rings 5, 6. The piston ring groove 4 is nearest the crank case and this groove contains a piston ring of my invention, it being unnecessary to provide such a piston ring in the other piston ring grooves of the piston. The innermost piston ring 6 is formed with a plurality of closely adjacent elongated channels 7 extending lengthwise circumferentially of the ring and extending through the ring to establish communication between the interior and exterior of the ring. Each long side of each channel converges inwardly toward the opposite long side of such channel and each end side of each channel converges inwardly toward the opposite end side of such channel. Inwardly converging or tapering bodies of lubricant are contained in the channels, these lubricant bodies being constantly replenished by lubricant flowing into the channels that is caught from the inner cylindrical surface of the cylinder to replace the lubricant which flows through the reduced inner ends of the channels at the interior of the ring. The provision of lubricant retaining pockets that have no communication with the interior of the ring is not essential. By virtue of the close endwise proximity of the channels, no passages are required in the exterior cylindrical surface of the ring to bring the channels into communication, there being sufficient outward and circumferential flow of lubricant at the ends of the channels to properly lubricate the exterior ring surface portions between the adjacent channels. The tool employed for forming the channels is desirably a milling tool having its peripheral portion wedge shaped in cross section. Such a tool is desirably employed because by the use thereof the opposite longitudinal walls of each channel are arcuate and bulge transversely of the ring from each other toward the flat faces of the ring respectively adjacent thereto. This formation of the channels enhances the circumferential flow of the lubricant therefrom, the lubricant then finding passage circumferentially of the ring along the outer cylindrical surface thereof not only from the ends of the channels but also from the long sides of the channels. While both of the long sides of each channel thus preferably bulge toward the flat faces of the ring respectively adjacent thereto, yet this feature of the invention need not, obviously, be thus limited.

Having thus described my invention, I claim:

1. A piston ring having closely adjacent and disconnected elongated channels extending and distributed circumferentially of the ring and passing through the ring, the opposite long sides of each channel converging inwardly and the opposite ends of each channel also converging inwardly.

2. A piston ring having closely adjacent and disconnected elongated channels extending and distributed circumferentially of the ring and passing through the ring, the opposite long sides of each channel converging inwardly.

3. A piston ring having elongated channels extending and distributed circumferentially of the ring and passing through the ring, the opposite long sides of each channel converging inwardly and the opposite ends of each channel also converging inwardly.

4. A piston ring having elongated channels extending and distributed circumferentially of the ring and passing through the ring, the opposite long sides of each channel converging inwardly.

5. A piston ring having closely adjacent and disconnected elongated channels extending and distributed circumferentially of the ring and passing through the ring, the opposite long sides of each channel converging inwardly and being of arcuate formation and bulging from each other toward the flat faces of the ring respectively adjacent the long sides of the channel and the opposite ends of each channel also converging inwardly.

6. A piston ring having closely adjacent and disconnected elongated channels extending and distributed circumferentially of the ring and passing through the ring, the opposite long sides of each channel converging inwardly and being of arcuate formation and bulging from each other toward the flat faces of the ring respectively adjacent the long sides of the channel.

7. A piston ring having elongated channels extending and distributed circumferentially of the ring and passing through the ring, the opposite long sides of each channel converging inwardly and being of arcuate formation and bulging from each other toward the flat faces of the ring respectively adjacent the long sides of the channel.

8. A piston ring having closely adjacent and disconnected elongated channels extending and distributed circumferentially of the ring and passing through the ring, the opposite long sides of each channel converging inwardly, some of said long channel sides outwardly bulging transversely of the ring, and the opposite ends of each channel also converging inwardly.

9. A piston ring having closely adjacent and disconnected elongated channels extending and distributed circumferentially of the ring and passing through the ring, the opposite long sides of each channel converging inwardly, some of said long channel sides outwardly bulging transversely of the ring.

10. A piston ring having elongated channels extending and distributed circumferentially of the ring and passing through the ring, the opposite long sides of each channel converging inwardly, some of said long channel sides outwardly bulging transversely of the ring and the opposite ends of each channel also converging inwardly.

11. A piston ring having elongated channels extending and distributed circumferentially of the ring and passing through the ring, the opposite long sides of each channel converging inwardly, some of said long channel sides outwardly bulging transversely of the ring.

In witness whereof, I hereunto subscribe my name.

CHARLES N. TEETOR.